United States Patent Office 3,567,518
Patented Mar. 2, 1971

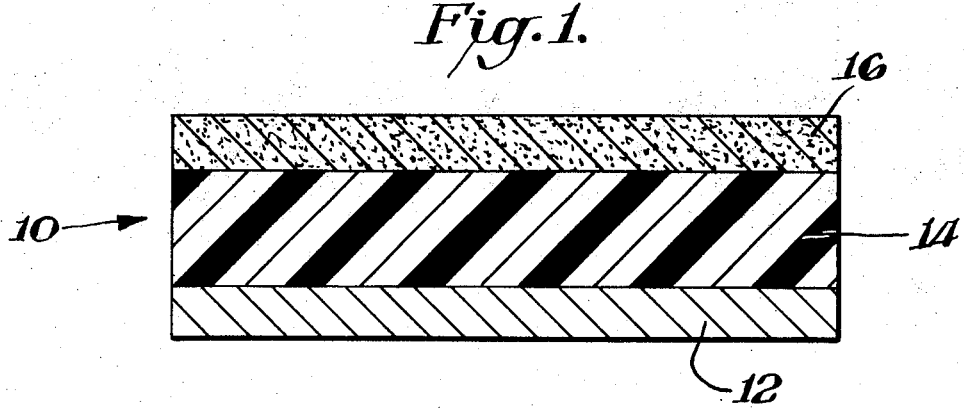
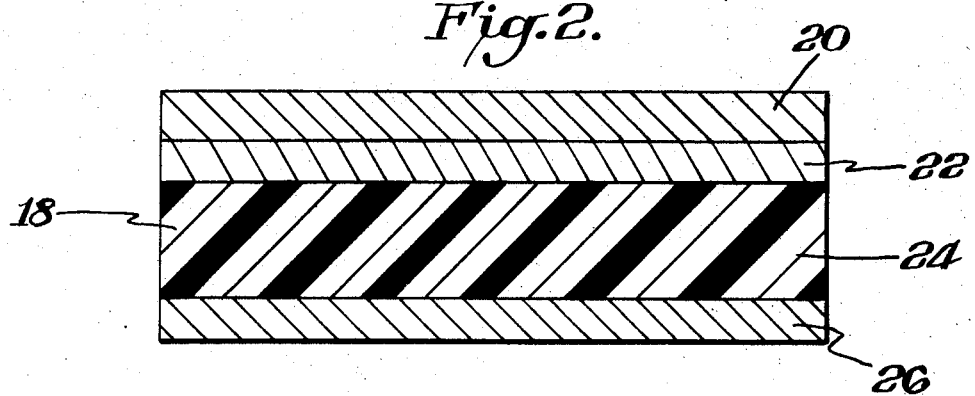

3,567,518
SOLID-STATE BATTERY CELL WITH COMPLEX ORGANIC ELECTROLYTE MATERIAL
Donald M. Smyth, Williamstown, Charles H. Tompkins, Jr., Clarksburg, and Sidney D. Ross, Williamstown, Mass., assignors to Sprague Electric Company, North Adams, Mass.
Filed Oct. 7, 1968, Ser. No. 765,531
Int. Cl. H01m 11/00; B01k 3/12
U.S. Cl. 136—83       3 Claims

ABSTRACT OF THE DISCLOSURE

In a battery or an electrical capacitor the solid electrolyte is a new composition of matter defined as the quaternary ammonium iodide-silver iodide reaction product of a Z-quaternary ammonium iodide and silver iodide, wherein the molar ratio of silver ion to the quaternary ammonium ion is greater than 2:1. The Z-quaternary ammonium ion is a member of the group consisting of $R_4N^+$, N—R substituted pyridinium, N—R substituted quinolinium and N—R substituted isoquinolinium. R is an alkyl, aryl, alkaryl or aralkyl group, and the R groups of $R_4N^+$ are the same or any combination of said groups.

BACKGROUND OF THE INVENTION

This invention relates to a new composition of matter, a battery and a capacitor, both utilizing a solid electrolyte.

Solid electrolyte batteries have been of great interest for many years because of their exceptional stability, physical ruggedness, and ease of miniaturization. They have, however, been extremely limited in their current-delivering capabilities because of the low ionic conductivities of available solid electrolytes. Most of the effort has been devoted to the silver halides, whose ionic conductivities fall in the range $10^{-4}$–$10^{-8}$ ohm$^{-1}$ cm.$^{-1}$. There have been recent reports on the extraordinarily high ionic conductivities of the compounds $MAg_4I_5$, where $M=K^+$, $Rb^+$, or $NH_4^+$ (the conductivities of all of these are about 0.2 ohm$^{-1}$ cm.$^{-1}$ at 25°), and the art is aware of a solid electrolyte battery based on the $Ag/RbAg_4I_5/RbI_3$ system. Because of the extremely high ionic conductivity of the $RbAg_4I_5$, these cells have current-delivering capabilities comparable with conventional batteries (Lelanché and mercury cells). The major disadvantages are the extremely high cost of the rubidium and the tendency for $RbAg_4I_5$ to slowly decompose into AgI and $Rb_2AgI_3$ below 27° C.

In the field of solid electrolyte capacitors, the art is constantly alert for a practical alternative for $MnO_2$ as a capacitor electrolyte.

It is an object of the present invention to present an electrical component employing a solid electrolyte.

It is another object of the invention to present a battery utilizing a solid electrolyte.

It is still another object to present an electrical capacitor utilizing a solid electrolyte.

It is yet another object to present a new composition of matter.

The above and further objects and novel features of the invention will more fully appear from the following detailed description.

SUMMARY OF THE INVENTION

The devices of the present invention may be termed an electrical component comprising a pair of electrodes separated by a novel solid electrolyte comprising the quaternary ammonium iodide-silver iodide reaction product of a Z-quaternary ammonium iodide and silver iodide, wherein the molar ratio of silver ion to the quaternary ammonium ion is greater than 2:1. The Z-quaternary ammonium ion is a member of the group consisting of $R_4N^+$, N—R substituted pyridinium, N—R substituted quinolinium and N—R substituted isoquinolinium. The R group is an alkyl, aryl, alkaryl or aralkyl group. The R groups of $R_4N^+$ are the same or any combination of said groups.

When the electrical component is a battery, the negative electrode comprises silver and the positive electrode comprises a source of iodine vapor. A particularly convenient source of iodine vapor is the triiodide salt of a Z-quaternary ammonium ion. The Z-quaternary ammonium ion of said triiodide has the same definition as the Z-quaternary ammonium ion of said Z-quaternary ammonium iodide.

In a preferred battery cell of the present invention the negative electrode consists essentially of a mixture of silver powder and said quaternary ammonium iodide-silver iodide reaction product in the weight ratio of from 6:1 to 1:1.5. The positive electrode consists essentially of a mixture of (1) conductive carbon, (2) a source of iodine vapor and (3) said quaternary ammonium iodide-silver iodide reaction product, in the ratio of from 1:4:0 to 1:22:80 respectively.

The use of the quaternary ammonium iodide-silver iodide reaction product in the negative and positive electrodes serves to reduce the contact resistance between these electrodes and the electrolyte.

A particularly preferred battery cell of the present invention employs as the inter-electrode the solid electrolyte reaction product of tetramethylammonium iodide and silver iodide. The negative electrode consists essentially of 1–2 parts by weight of said solid electrolyte and 1–2 parts by weight of silver. The positive electrode consists essentially of from 1–3 parts by weight each of (1) conductive carbon, (2) tetramethylammonium triiodide and (3) said solid electrolyte.

When the electrical component is a capacitor, the anode is a valve metal, the dielectric is the anodized surface of the valve metal, said solid electrolyte quaternary ammonium iodide-silver iodide reaction product is in contact with said dielectric and a cathode is in contact with said electrolyte.

BRIEF DESCRIPTION OF THE DRAWING

FIG. 1 is a side view of a section of a battery within the scope of the invention.

FIG. 2 is a side view of a section of a capacitor within the scope of the present invention.

In FIG. 1 there is shown a battery cell 10 consisting of a negative electrode 12, a solid electrolyte reaction product 14 and a positive electrode 16.

In FIG. 2 there is shown an electrical capacitor 18 consisting of a valve metal anode electrode 20, valve metal oxide dielectric 22, solid electrolyte reaction product 24 and cathode electrode 26.

DETAILED DESCRIPTION OF THE INVENTION

Example I

A battery cell was prepared as follows: 2.078 gms. of tetramethylammonium iodide, $(CH_3)_4NI$, and 9.705 gms. of silver iodide, AgI, were mixed and ground together and then sealed in an evacuated quartz tube. The mixture was heated in a furnace to about 300° C. and held there for ½ hour. The reactants became molten and complete mixing was assured by agitating the tube. The reaction product was quenched by removing the tube immediately to room temperature. The reaction product was removed from the tube and reduced to a fine powder. Employing 50,000 lbs./in.$^2$, a disc of the reaction product ½ inch in diameter and 25 mils thick was formed. The compressed disc had a resistivity of 65 ohm cm. As the anode, 2 parts by weight of silver powder to 1 part by weight of the powdered reaction product was formed into a disc having the same dimensions as the solid electrolyte disc. As the cathode, 1:20:35 parts by weight of carbon black, tetramethylammonium triiodide and the solid electrolyte reaction product respectively, were mixed and compacted into a disc having the same dimensions as the anode and solid electrolyte discs. Platinum foil contact sheets, 10 mils thick, were spring pressure contacted to the anode and cathode. This cell had an open circuit voltage of 0.62 volt and an internal resistance of 50 ohm.

In view of the fact that a comparable cell employing $RbAg_4I_5$ and $RbI_3$ would cost more than ten times that of the cell of the foregoing example, the results are outstanding. This, coupled with the fact that the electrolyte of the subject battery is far more stable at temperatures below room temperature than that of the rubidium system, strongly illustrates the advantages of the present invention.

To illustrate the greater stability of the tetramethylammonium iodide-silver iodide reaction product over $RbAg_4I_5$, samples of each electrolyte were pressed between electrodes consisting of a mixture of powdered silver and said reaction product. The samples were stored at 25°, 20° and 0° C. under both ambient and dry conditions. Resistance readings at 1000 Hz. were taken for each sample at frequent, but irregular intervals.

The initial resistance values for the reaction product were approximately ten times higher than those of the $RbAg_4I_5$ and these values remained effectively constant throughout the one-hundred twenty day evaluation period. All the $RbAg_4I_5$ samples stored in ambient moisture increased in resistance from three to four orders of magnitude in the same time period, thereby greatly surpassing the resistance of the reaction product samples. Under dry storage a similar increase for the $RbAg_4I_5$ was noted at zero degrees, but not at the higher temperature. Other samples of the reaction product were stored at $-78°$ C. and these also have shown no increase in resistance over a one-hundred twenty day storage period.

The following tabulation shows resistivity versus specific Z-quaternary ammonium iodide-silver iodide reaction products. The samples were prepared by heating the indicated proportions at 200–350° C. in an evacuated quartz tube until the reaction was complete. The reaction product was removed from the tube and reduced to powder form. Resistivity was determined by pressing the powder into pellets and measuring resistance as a function of the solid electrolyte thickness. The electrodes employed were pressed mixtures of the solid electrolyte reaction product and powdered silver.

RESISTIVITY
(Ohm. cm.)

| Composition | Reaction product | | |
|---|---|---|---|
| | (1) | (2) | (3) |
| Moles AgI : Moles Z-quaternary ammonium iodide | | | |
| 1:1 | $2.0 \times 10^5$ | | |
| 2:1 | 360 | $3.7 \times 10^5$ | $3.7 \times 10^4$ |
| 3:1 | 120 | 1,600 | 470 |
| 4:1 | 65 | 230 | 180 |
| 6:1 | 55 | 140 | 190 |
| 9:1 | 70 | 280 | 270 |

1 Tetramethylammonium iodide-silver iodide reaction product.
2 p - Methoxytrimethylbenzylinium iodide - silver iodide reaction product.
3 4-vinyl, N-methylpyridinium iodide-silver iodide reaction product.

It is believed that good advantage over pure silver iodide can be obtained with a molar ratio of silver ion to quaternary ammonium ion of as high as 20:1.

The process conditions necessary to form the solid electrolyte of the present invention include heating the Z-quaternary ammonium iodide with silver iodide at a temperature between about 250° C.–350° C. in a closed system having a comparatively inert atmosphere, (e.g. helium or a partial vacuum) for a period between about 5–60 minutes.

In the foregoing example, in place of tetramethyl ammonium iodide, the following iodides may be reacted with silver iodide to form a solid electrolyte reaction product within the scope of the present invention:

N-methylpyridinium iodide
4-vinyl-N-methylpyridinium iodide
poly 4-vinyl-N-methylpyridinium iodide
N-methylquinolinium iodide
N-methylisoquinolinium iodide
trimethylanilinium iodide
p-methoxybenzyltrimethylammonium iodide As indicated above the N-substituted group can be alkyl, aryl, alkaryl or aralkyl. The alkyl group can be any $C_1$–$C_{18}$ group, the aryl group can be phenyl or naphthyl, the alkaryl group can be any $C_nH_{2n}C_6H_5$ group and the aralkyl group can be any $C_nH_{2n+1}C_6H_5$ group. It is also to be understood that the pyridinium, quinolinium and isoquinolinium ring may be substituted with one or more groups, as illustrated by the 4-vinyl-N-methylpyridinium compound.

It is also contemplated associated the silver-containing anion with a quaternary ammonium cation which is part of a polymer chain. For example, quaternizing polyvinylpyridine with methyl iodide to form N-methylpyridinium iodide groups pendant from the polymer chain, followed by reaction of the polymer with silver iodide to yield a salt with a polymeric cation having associated silver-containing anions.

Example II

Another battery cell was prepared as in Example I except that the electrolyte was prepared by reacting 1.060 gms. of poly 4-vinyl-N-methylpyridinium iodide and 4.638 gms. of silver iodide in an evacuated quartz tube at 300° C. for about ½ hour. The powdered reaction product had a resistivity of 250 ohm cm.

The cell had an open circuit voltage of 0.61 volt and an internal resistance of 90 ohms.

EXAMPLE III

A capacitor was prepared as follows: a piece of 10 mil thick, annealed tantalum foil was anodized to 75 volts. A pressed disc of the solid electrolyte reaction product of Example I, having an area of 0.278 sq. cm., was contacted to the anodized foil by pressure. This device had a capacitance of 0.022 microfarads and a dissipation factor of 7.2%.

Any of the other valve metals such as aluminum, titanium, zirconium, niobium, etc., either in foil, wire or porous pellet form may be employed as the anode of the capacitor. Any of the other solid electrolyte reaction products of the present invention may be substituted for the one employed in the preceding example. The cathode electrode of the capacitor may be conductive carbon, a metallic electrode or a combination thereof. A preferred film is a combination of graphite and silver.

For the positive electrode of the battery of the present invention, examples of other iodine sources are:

Iodine
$RbI_3$
tetramethylammoninum triiodide
N-methyl pyridinium triiodide
N-methylquinolinium triiodide
trimethylanilinium triiodide Since it is obvious that many changes and modifications can be made in the above-described details without departing from the nature and spirit of the invention it is to be understood that the invention is not limited to said details except as set forth in the appended claims.

What is claimed is:

1. A battery cell comprising a negative electrode and a positive electrode separated by a solid electrolyte consisting essentially of the reaction product of (1) a member of the group consisting of poly 4-vinyl-N-R-pyridinium iodide, poly 4-vinyl-N-R-quinolinium iodide and poly 4-vinyl-N-R-isoquinolinium iodide and (2) silver iodide, wherein R is an alkyl, aryl, alkaryl or aralkyl group wherein the molar ratio of silver ion to pyridinium ion is greater than 2:1; the negative electrode consists essentially of a mixture of silver powder and said solid electrolyte in the weight ratio of 6:1 to 1:1.5 and wherein the positive electrode consists essentially of a mixture of (1) conductive carbon, (2) a source of iodine vapor, and (3) said solid electrolyte, in the ratio of 1:4:0 to 1:22:80 respectively.

2. The battery cell of claim 1 wherein said solid electrolyte consists essentially of the reaction product of poly 4-vinyl-N-R-pyridinium iodide and silver iodide.

3. The battery cell of claim 2 wherein the negative electrode consists essentially of 2 parts by weight of silver powder and 1 part by weight of said solid electrolyte; and the positive electrode consists essentially of 1:20:35 parts by weight of (1) conducting carbon, (2) tetramethylammonium triiodide and (3) said solid electrolyte respectively.

References Cited
UNITED STATES PATENTS

| | | | |
|---|---|---|---|
| 3,352,720 | 11/1967 | Wilson et al. | 136—137 |
| 3,476,605 | 11/1969 | Owens | 136—83 |
| 3,476,606 | 11/1969 | Owens | 136—83 |

OTHER REFERENCES

Gutmann et al., Solid-State Electrochemical Cells Based on Charge Transfer Complexes, J. Electrochem. Soc. vol. 114, No. 4, pages 323–329, April 1967. Copy in 136–153.

DONALD L. WALTON, Primary Examiner

U.S. Cl. X.R.

136—153; 252—62.2